S. CASPE.
STOCK AND POULTRY FOUNTAIN AND FEEDER.
APPLICATION FILED OCT. 25, 1918.
1,343,349.
Patented June 15, 1920.
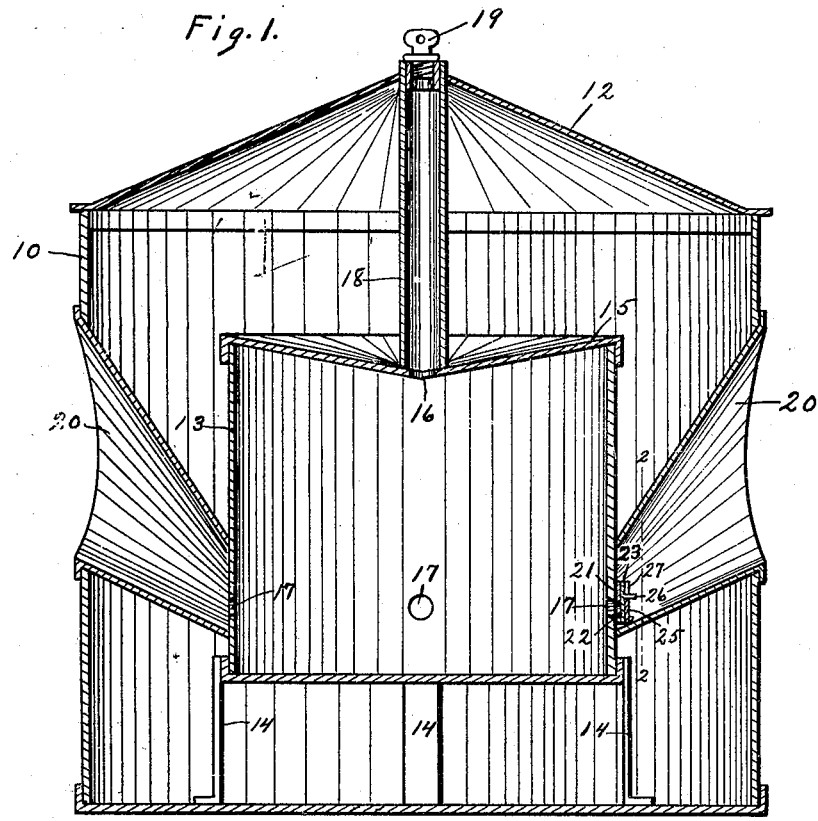
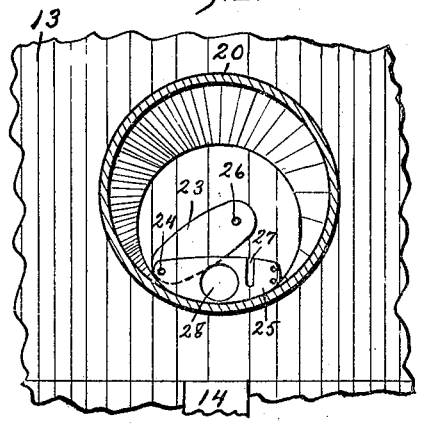
INVENTOR:
SAMUEL CASPE
By
Earl M. Sinclair
Atty.

S. CASPE.
STOCK AND POULTRY FOUNTAIN AND FEEDER.
APPLICATION FILED OCT. 25, 1918.
1,343,349.
Patented June 15, 1920.
2 SHEETS—SHEET 2.
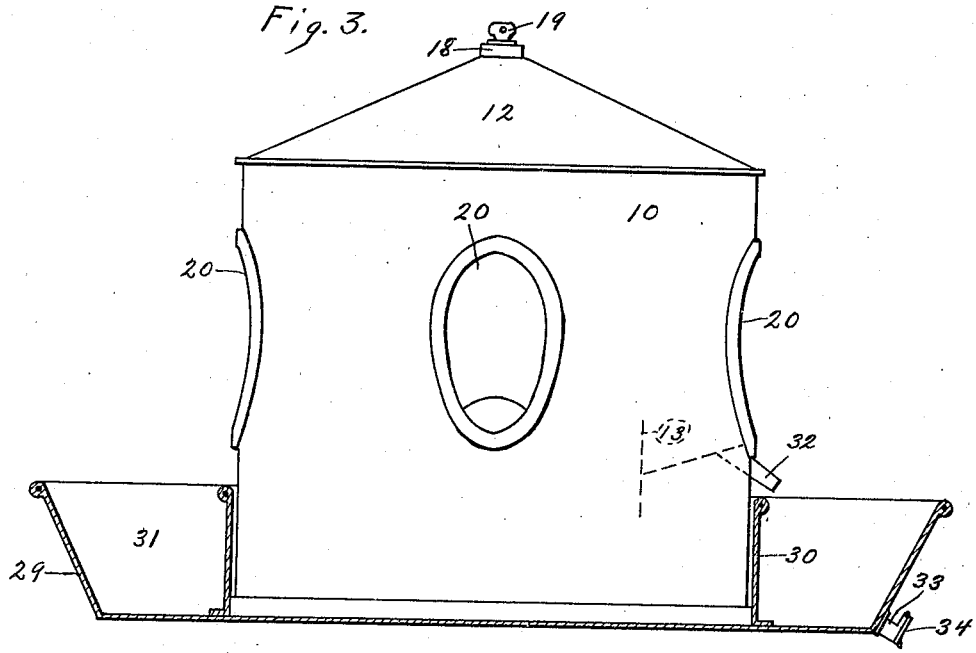
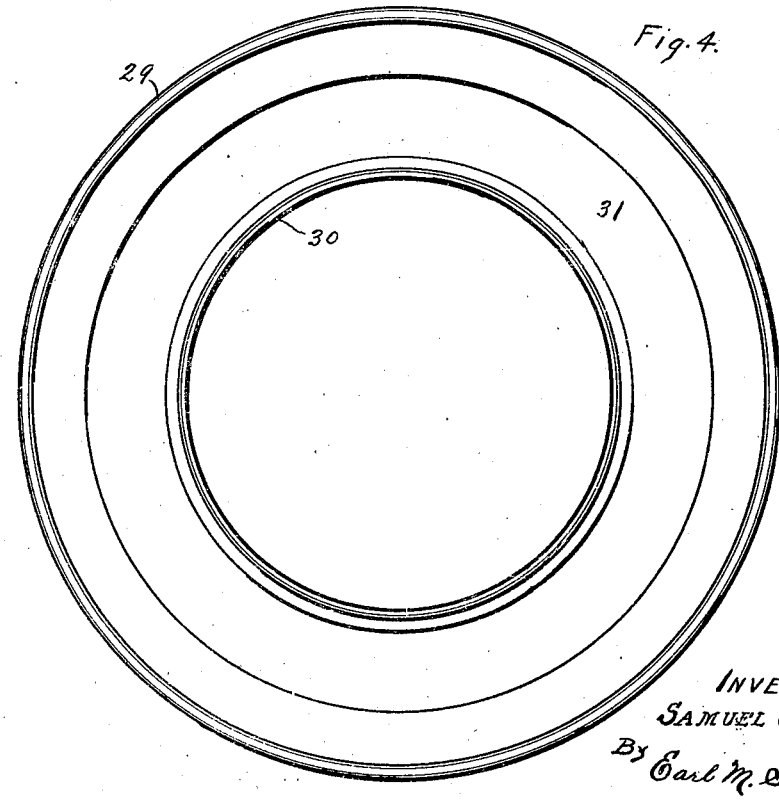
INVENTOR:
SAMUEL CASPE
By Earl M. Sinclair
Atty.

UNITED STATES PATENT OFFICE.

SAMUEL CASPE, OF DES MOINES, IOWA.

STOCK AND POULTRY FOUNTAIN AND FEEDER.

1,343,349.  Specification of Letters Patent.  Patented June 15, 1920.

Application filed October 25, 1918. Serial No. 259,731.

*To all whom it may concern:*

Be it known that I, SAMUEL CASPE, a citizen of Russia, and resident of Des Moines, Polk county, Iowa, have invented a new and useful Stock and Poultry Fountain and Feeder, of which the following is a specification.

The object of this invention is to provide an improved construction for poultry fountains.

A further object is to provide a sanitary fountain in which drinking water for poultry or stock may be maintained at an equable temperature irrespective of the temperature of the surrounding atmosphere.

A further object of this invention is to provide a plurality of drink openings and means for filling the container without loss of water through either of the openings.

Another object is to provide a combined stock and poultry fountain and feeder.

My invention consists in the construction, arrangement and combination of elements hereinafter set forth, pointed out in my claims and illustrated by the accompanying drawing, in which—

Figure 1 is a central vertical section of the fountain, one only of the valve devices for the water exits being shown, that in closed position. Fig. 2 is a vertical detail section on the line 2—2 of Fig. 1, on an enlarged scale, a valve device being shown in open position. Fig. 3 is a view showing the feeding attachment in vertical section and the fountain mounted therein in elevation. Fig. 4 is a plan of the feeder attachment with the fountain removed.

In the construction of the fountain device as shown a suitable housing is provided and consists of a cylindrical side wall 10, a bottom 11 secured thereto, and an arched or dome-shaped top 12 on the upper end of said side wall. The parts of the housing preferably are formed of galvanized sheet metal, the bottom 11 and top 12 preferably being sealed to the side wall 10 as by soldering. A water tank 13 is mounted within the housing and preferably is supported above the bottom 11 by means of legs 14. The tank 13 also is formed of sheet metal and preferably is cylindrical in form and concentric with the housing 10. The tank 13 is closed and sealed at its upper end by a dished or concaved top 15 having its concaved face arranged upwardly, and said tank is hermetically sealed except for an entrance opening 16 in the center of the top 15 and a plurality of exit openings 17 in its sides, preferably near the bottom. The exit openings 17 may be of any desired number, in this instance four equally spaced circumferentially of the tank. A pipe 18 leads from the entrance opening 16 upwardly to and opens through the cover 12 of the housing, and is adapted to have its upper end closed by a screw plug 19 or other suitable means. Drinking cups 20 are provided and lead from the exit openings 17 to and open through the side wall 10 of the housing and said cups preferably are of approximately frusto-conical form with their smaller ends arranged toward and sealed to the wall of the tank 13 and with their larger ends sealed to the wall 10 of the housing. The cups 20 also preferably are inclined downwardly toward the tank and exit openings. The drinking cups 20 provide receptacles to contain small quantities of water flowing from the tank 13, and this quantity is automatically replenished from the tank as it is used. The exit openings 17 preferably are located adjacent the lowermost margins of the inner ends of the cups 20 so that only small quantities of water are permitted to flow out at a time, and fresh water is frequently permitted to escape to said cups in use. The holes 17 also are relatively small. The flaring or enlarged outer ends of the cups provide room for the heads of fowls in the act of drinking.

The tank 13 is spaced on all sides from the housing, thus providing a dead air space entirely surrounding said tank and insulating its contents from the heating or undue cooling influences of the surrounding atmosphere. The water in the tank is kept cool in warm weather and prevented from freezing in cold weather without the use of heating devices.

The tank 13 is supplied with water by removing the plug 19 and pouring water into the pipe 18 through a funnel or a conductor having a small nozzle. As the exit openings 17 are near the bottom of the tank they must be closed during the filling operation, and to this end manually operable valve devices are provided. A plate 21 having a hole 22 therein is mounted over the side wall of the tank 13, within each of the drinking cups 20, with its hole registering with an exit opening 17. A valve plate 23, which is imperforate, is pivoted by a pin or rivet 24 to the plate 21 and is adapted to cover the holes 22 and 17 at times. A keeper 25 is fixed to the plate 21 outside of the valve plate and is adapted to hold said valve plate tightly in contact with said plate 21. An outwardly projecting pin or stud 26 on the valve plate is adapted to be seated in a vertical slot 27 in the keeper when the valve plate is closed. When it is desired to replenish the supply of water in the tank 13, the screw plug 19 is first removed, thereby permitting an inrush of air through the pipe 18 and entrance opening 16 and displacing the residue of water in said tank, which escapes through the holes 17. The valve plates 23 are then closed and water introduced to the tank, after which the plug 19 is inserted and the valve plates reopened. The keeper is formed with a hole 28 registering with the holes 17 and 22.

In Figs. 3 and 4 I have shown a feeder attachment adapted to be used in conjunction with the fountain above described. This feeder comprises a pan 29 preferably having a plane bottom and an inclined side wall circular in plan, said pan being of materially larger diameter than the side wall 10 of the fountain housing and of considerably less height, preferably being of less height than the lower portions of the drink openings or cups 20. A perpendicular retaining wall is mounted within, fixed to and arranged concentrically of the wall of the pan 29 and is designated by the numeral 30. The diameter of the retaining wall is only a trifle greater than the diameter of the fountain housing 10, and said retaining wall is adapted to receive and contain the fountain device as shown in Fig. 3. An annular feeding space 31 is formed between the retaining wall 30 and inclined wall of the pan 29 and is adapted to contain any desired form of stock or poultry food, such as grains, mash or scraps.

If desired a spout 32 may lead from one or more of the drinking cups 20 to conduct water therefrom to the annular feeding space 31 of the pen, as shown in Fig. 3. Water may be caused to flow from said spout by admitting air through the pipe 18 by removal of the screw plug 19.

It is also convenient to provide an exit pipe or spout 33 for the lower portion of the pan, leading from the annular feeding space 31, for removal of fluid therefrom at times, said pipe or spout normally being closed by a hinged valve plate 34, shown conventionally.

I claim as my invention—

1. A device of the class described, comprising a cylindrical fountain provided with lateral drinking cups, and a feeding pan of greater diameter than said fountain and provided with an interior concentric retaining wall adapted to receive and contain said fountain, whereby an annular feeding space is formed surrounding said fountain and below said drinking cups.

2. A device of the class described, comprising a cylindrical fountain provided with lateral drinking cups, and a feeding pan of greater diameter than said fountain and provided with an interior concentric retaining wall adapted to receive said fountain, whereby an annular feeding space is formed surrounding said fountain and below said drinking cups, means being provided for supplying water from one or more of said drinking cups to said annular space.

3. A device of the class described, comprising a cylindrical fountain provided with lateral drinking cups, and a feeding pan of greather diameter than said fountain and provided with an interior concentric retaining wall adapted to receive said fountain, whereby an annular feeding space is formed surrounding said fountain and below said drinking cups, means being provided for supplying water from said fountain to said annular space and for withdrawing water from said space.

4. In a device of the class described, a substantially cylindrical casing having a top rigidly secured thereto, a hole being formed substantially in the center of said top, a tank mounted in and spaced on all sides from said casing, a pipe extending from the hole in top of said casing to and passing through the top of said tank, holes also being formed in the side wall of said casing and in the sides of said tank, and frusto-conical devices mounted in said casing in inclined positions and having their larger ends registering with the side openings of and sealed to the casing and having their smaller ends registering with the side openings of and sealed to said tank.

SAMUEL CASPE.